Feb. 12, 1957     I. S. ROBERTS     2,780,933
LIQUID TREATING APPARATUS
Filed Dec. 18, 1952     2 Sheets-Sheet 1
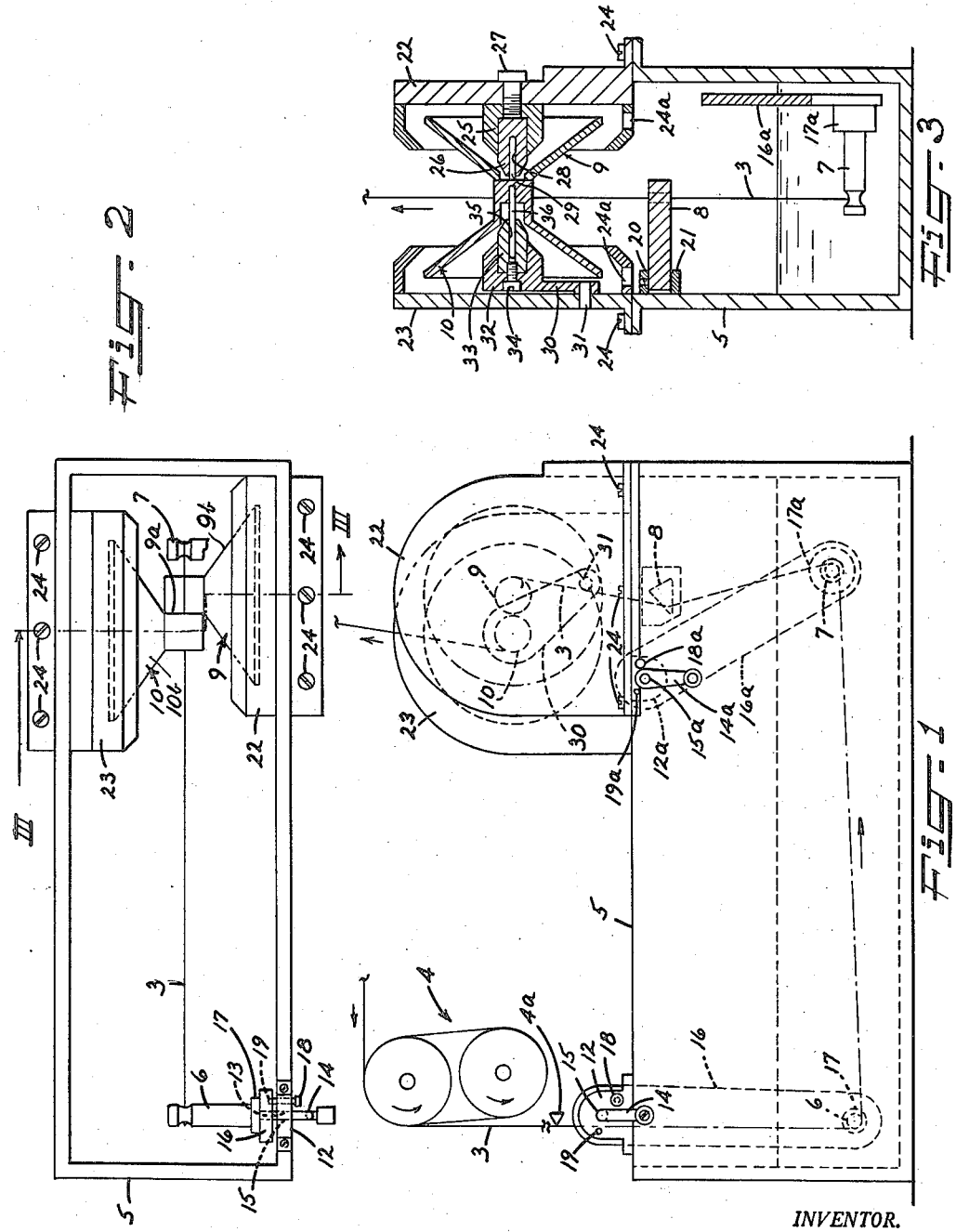
INVENTOR.
INGHAM S. ROBERTS
BY
Thomas R. O'Nelly
ATTORNEY.

Feb. 12, 1957     I. S. ROBERTS     2,780,933
LIQUID TREATING APPARATUS
Filed Dec. 18, 1952     2 Sheets-Sheet 2
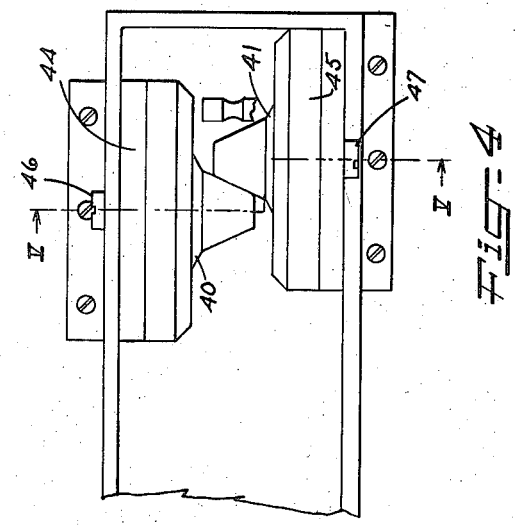
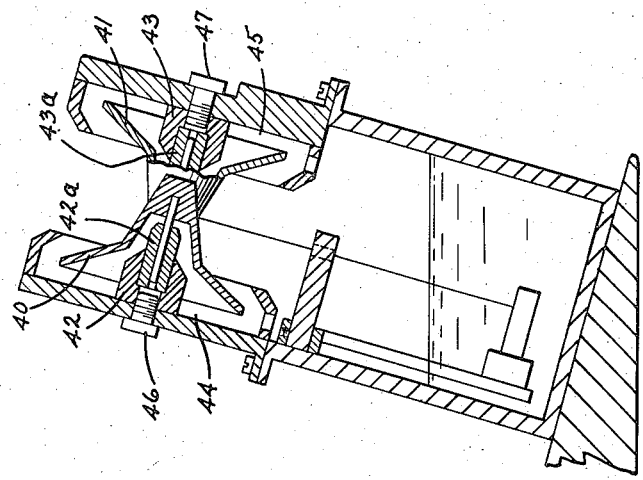
INVENTOR.
INGHAM S. ROBERTS
BY
*Thomas B. O'Nelly*
ATTORNEY.

United States Patent Office 2,780,933
Patented Feb. 12, 1957

2,780,933

LIQUID TREATING APPARATUS

Ingham S. Roberts, Ridley Park, Pa., assignor to American Viscose Corporation, Philadelphia, Pa., a corporation of Delaware Application December 18, 1952, Serial No. 326,686

6 Claims. (Cl. 68—244)

The present invention relates to the manufacture and production of synthetic filamentary materials and more particularly to novel and improved methods and apparatus for applying and removing treating liquids from a continuously advancing filamentary material or the like.

In the textile art it is often necessary during the various conventional liquid treating operations to control the application of the liquid with high accuracy and uniformity. More specifically, oftentimes considerable care must be taken to be sure that excess liquid is not carried by the continuously advancing filamentary material from one liquid treating stage to another and that the residual liquid remaining on the continuously advancing material is uniformly distributed along successive portions thereof.

One method which has been employed in the past to remove the excess liquid from the continuously advancing filamentary material was set out and disclosed in the U. S. Patent No. 2,524,177, issued to Ingham S. Roberts on October 3, 1950. In accordance with that procedure the continuously advancing filamentary material is directed about the periphery of a reduced diameter portion of a centrifugal disk or throw-off device so that the excess treating liquid is removed from the filamentary material and directed outwardly over the sloped periphery of the said device toward a suitable excess liquid collecting means. Although this procedure was a marked improvement over those which were employed in the art theretofore, it has been found that the centrifugal forces which are depended upon to transfer excess liquid on the throw-off device toward its outer periphery also tend to direct the excess liquid in the yarn towards its outer surface, thereby hindering the transfer of the liquid from the yarn to the throw-off device and impeding the extraction efficiency thereof.

It is a principal object of the present invention to provide novel and improved methods and apparatus for the uniform extraction of excess treating liquids from a continuously advancing filamentary material or the like.

It is a further object of the present invention to provide a novel and improved centrifugal liquid extraction device which operates with greater efficiency and which improves the uniformity of the liquid treating operation.

Other objects and advantages of the invention will be apparent from the following description.

In the drawing which is illustrative of the present invention,

Figure 1 is a side view of a preferred embodiment of the present invention;

Figure 2 is a top view of the embodiment shown in Figure 1 with parts broken away;

Figure 3 is a section of a slightly modified form as seen generally along line III—III in Figure 2;

Figure 4 is a fragmentary top view of another embodiment of the present invention; and Figure 5 is a sectional view of a slightly modified form as seen generally along reference line V—V in Figure 4.

In general, the improved liquid extracting apparatus of the present invention includes liquid applying means, a centrifugal liquid extracting device through which the continuously advancing material is conducted following the liquid treating operation, the material being slightly compressed or squeezed as it passes through the extracting device so as to properly initiate the liquid removal operation, and means associated with the centrifugal liquid extracting device for collecting the excess liquid removed from the material. It has been found that the liquid extracting operation may be performed in such a manner with improved uniformity and efficiency.

One preferred embodiment of the present invention is disclosed in Figures 1 through 3 of the drawing. As illustrated therein, the filamentary material or the like 3 is preferably directed from any suitable processing apparatus such as the thread advancing device 4, downwardly over the wiper 4a into any suitable washing or treating liquid which is confined in the treating tank or the like 5, about the grooved guide bars 6 and 7, over the notched wiper guide 8, about and between the rotary extractor members or squeeze rolls 9 and 10, and on to any suitable subsequent processing station not shown on the drawing.

The treating tank 5 which is preferably positioned as shown on any suitable support substantially directly beneath the thread advancing device 4, is ordinarily supplied in any suitable manner not shown on the drawing by a liquid such as water to wash, dilute, neutralize and preliminarily remove the residual and/or excess treating liquids from the continuously advancing material 3. In this way, as will be more apparent hereinafter, even if the removal of the treating liquid therefrom is not complete the tendency to contaminate the succeeding liquid treating solutions will be effectively reduced. The bearing 12 mounted on one wall of the treating tank is preferably apertured as at 13 to receive and support the crank lever 14 and its associated shaft 15 which passes therethrough. The guide support member 16 which is secured in any suitable manner to the inner extremity of the shaft 15 normally extends downwardly into the tank 5 as shown but as will be more apparent hereinafter may be temporarily positioned above the tank during the lacing operation by properly rotating the attached crank lever 14. The grooved guide bar 6 which is preferably fixedly mounted as shown in any suitable manner in the member 17 at the lower extremity of the guide support member 16 guides the continuously advancing material through the liquid bath in the tank 5.

The conventional spring locking device which is generally designated at 18 cooperates with the complementary apertures or the like 19 in the upper extremity of the guide support member 16 to properly secure it in either its normal operative position or its lacing position.

Similarly the bearing 12a which is also positioned adjacent the upper periphery of the tank is adapted to rotatably support the crank lever 14a, the shaft 15a, the guide support member 16a, the grooved guide bar 7 and its support member 17a and to thereby provide a suitable guide for the continuously advancing material 3 as it passes through the liquid bath. The spring locking device 18a and the complementary apertures 19a adjacent the upper extremity of the lever member similarly cooperate to selectively secure it in either its normal operative position or its lacing position.

The notched wiper guide 8 which is preferably generally triangular in section is secured by the set screw 20 in the bracket 21 which is mounted on the inner lateral periphery of the tank 5 as shown. The wiper guide extends inwardly therefrom in this way so as to engage the continuously advancing filamentary material 3 as it proceeds upwardly from the grooved guide bar 7.

The shrouds 22 and 23, which are secured to the flanged rim of the tank 5 preferably by the cap screws 24 as shown, serve as annular collecting troughs. As will be more apparent hereinafter the apertures or slots 24a positioned at the bottom of the troughs permit the liquid collected therein to be returned to the tank 5. The bearing member 25 and its insert 26 of a synthetic plastic material such as polytetrafluoroethylene commonly sold on the market under the trade name Teflon or other suitable bearing material which is securely positioned therein is preferably fastened to the shroud member 22 by the cap screw or the like 27 and extends inwardly therefrom. The centrally located bore 28 in the bearing insert is adapted to slidably receive and rotatably support the complementary pin member or shaft 29 which is secured to the cylindrical hub of the squeeze roll 9 and which extends inwardly along the axis thereof.

The member or arm 30 which is pivotally mounted on the inner lateral surface of the shroud member 23 in any suitable manner such as by the pin or the like 31 extends upwardly as shown in its normal operative position. The bearing member 32 together with its associated integral bearing insert 33 is preferably secured to the upper extremity of the arm 30 by any suitable means such as the cap screw or the like 34. The centrally located bore 35 in the bearing insert 33 is adapted to slidably receive and rotatably support the complementary pin member or shaft 36 which is secured to the hub of the floating associated squeeze roll 10 and which extends inwardly along the axis thereof. The term floating as used in conjunction with the associated squeeze roll 10 is used to describe the ability of the roll 10 to swing or pivot toward and away from the squeeze roll 9 to permit variations in spacing and pressure between the two rolls.

In operation the filamentary material which is to be treated in accordance with the present invention is directed downwardly from the thread advancing device 4, successively about the grooved guide bars 6 and 7 which during the lacing operation may be temporarily positioned above the surface of the treating liquid, over the wiper guide 8, and about and between the squeeze rolls 9 and 10. From the squeeze rolls, the yarn or thread may be passed to an additional processing station or stations. As best shown in Figure 1 due to the angle of approach and withdrawal of the filamentary material 3 as it passes about and between the squeeze rolls 9 and 10 the hubs of the rolls are automatically urged towards each other to press the filament or yarn therebetween, thus removing excess liquid from the yarn. Thereafter, the excess liquid is carried along the trough 9a formed between the hubs of the rolls and then, due to the centrifugal forces developed by the rotation of the rolls in combination with the adsorption of the liquid by the surfaces of the rolls, outwardly over their flared skirts 9b and 10b. The liquid which is carried beyond the outer edge of the skirts is then collected in the troughs 22 and 23 and directed back to the treating bath through the apertures or the like 24a formed therein.

Another embodiment of the present invention is shown in Figures 4 and 5 of the drawing. As illustrated therein each of the squeeze rolls 40 and 41 are mounted in the bearing inserts 42a and 43a of the bearing members 42 and 43 which are centrally positioned on the inner periphery of the members 44 and 45 by the cap screws or the like 46 and 47. The contiguous hubs of the rolls of this embodiment are preferably frusto-conically shaped as is best shown in Figure 5. As the liquid treating apparatus of this embodiment of the invention is angularly mounted as shown, the floating squeeze roll 40 is biased by gravity downwardly in its bearing against the squeeze roll 41 to produce the desired tension upon the continuously advancing filamentary material as it passes about and between the rolls. In this instance, the term floating as used in conjunction with the roll 40 refers to the ability of the roll to slide axially within its supporting bearing to permit variations in spacing and pressure between the two rolls.

A further description of the structural and operative features and details of this embodiment of the invention is not deemed necessary or expedient since they are substantially similar to those set out in the previously described embodiment of Figures 1 to 3.

While preferred embodiments of the invention have been disclosed, the description is intended to be illustrative only and it is to be understood that changes and variations may be made without departing from the spirit and scope of the invention as defined by the appended claims.

I claim:

1. In a squeeze roll liquid removal apparatus for continuously traveling threads and the like, a first cantilever mounted squeeze roll having a relatively small diameter thread-contacting hub at the outer end thereof, a relatively large diameter sling adjacent to and forming an extension of said hub, a shaft coaxially secured to said hub by which the squeeze roll is journalled, a stationary bearing for supporting the shaft, an annular liquid collecting trough surrounding said sling, a second cantilever mounted squeeze roll identical and opposed to the first roll and having its hub parallel and offset to the hub of the first roll in such a manner that the thread-contacting hubs lie opposite one another whereby the hubs may contact and squeeze a continuously travelling thread passing between the hubs, said rolls adapted to be driven by the thread passing between the hubs, a support for the second roll which permits the roll to float substantially unopposed in a reciprocal and confined path toward and away from the first roll whereby proper squeezing pressure may be applied to the thread passing in contact with and between the hubs, the floating movement of the second roll during operation being controlled by the thread being processed by the rolls, and a second annular liquid collecting trough surrounding the sling on the second squeeze roll.

2. Apparatus in accordance with claim 1 in which the yarn-contacting hubs of the floating and non-floating rolls are cylindrical.

3. Apparatus in accordance with claim 1 in which the yarn-contacting hubs of the floating and non-floating rolls are frusto-conical.

4. Apparatus in accordance with claim 3 in which the floating and non-floating squeeze rolls are inclined to the horizontal.

5. Apparatus in accordance with claim 2 in which said support for the second roll comprises a swingable bearing for pivotally supporting the shaft of said floating squeeze roll.

6. Apparatus in accordance with claim 4 in which said support for the second roll comprises a stationary bearing and a bearing insert therewithin for slidingly supporting the shaft of the floating squeeze roll.

References Cited in the file of this patent

UNITED STATES PATENTS

| Number | Name | Date |
|---|---|---|
| 612,842 | Griffith | Oct. 25, 1898 |
| 1,165,896 | Palmer | Dec. 28, 1915 |
| 1,524,390 | Dil | Jan. 27, 1925 |
| 2,061,556 | Blake | Nov. 21, 1936 |
| 2,074,022 | Oppenlaender | Mar. 16, 1937 |
| 2,439,829 | Tippettes | Apr. 20, 1948 |
| 2,514,321 | Fekete | July 4, 1950 |
| 2,583,568 | Heizer | Jan. 29, 1952 |
| 2,615,763 | Wolford | Oct. 28, 1952 |